United States Patent [19]

Crayton et al.

[11] 4,076,411
[45] Feb. 28, 1978

[54] APPARATUS AND METHOD FOR MAKING PRINTS

[75] Inventors: Bruce E. Crayton, Rochester; James F. Wilson, Webster; Carl H. Zirngibl, Irondequoit, all of N.Y.

[73] Assignee: Eastman Kodak Company, Rochester, N.Y.

[21] Appl. No.: 632,031

[22] Filed: Nov. 14, 1975

[51] Int. Cl.² ............................................. G03B 29/00
[52] U.S. Cl. ..................................... 355/28; 219/216; 355/77
[58] Field of Search ..................... 355/27, 28, 29, 100, 355/106, 77; 354/299; 219/216

[56] References Cited

U.S. PATENT DOCUMENTS

| | | | |
|---|---|---|---|
| 3,136,237 | 6/1964 | Moon | 355/106 |
| 3,167,996 | 2/1965 | Adler | 355/28 |
| 3,246,591 | 4/1966 | Robertson | 355/109 |
| 3,640,198 | 2/1972 | James | 355/28 X |
| 3,779,641 | 12/1973 | Hauck | 355/28 X |

FOREIGN PATENT DOCUMENTS 1,231,919   5/1971   United Kingdom.

*Primary Examiner*—Fred L. Braun
*Attorney, Agent, or Firm*—N. Rushefsky

[57] ABSTRACT

Apparatus and method are provided for cyclically controlling the metering of photosensitive sheet material into an exposure station, cutting the material to a selected length, exposing the material to form a latent image thereon and advancing the sheet onto a rotating drum upon which the sheet is processed by the application of heat. To minimize the size of the apparatus and to reduce the time between exposures of successive prints the drum is made relatively small but rotated at a correspondingly higher rate with appropriate processing time provided by having each portion of the sheet remain on the drum for more than one revolution of the drum. Rotation of the drum is controlled by a counting mechanism to ensure that the drum has turned a sufficient number of revolutions to fully process the sheet and remove same from the apparatus. The apparatus also controls a stripper element so that this element is actuated at an appropriate time in a print cycle to remove the processed sheet from the drum.

17 Claims, 23 Drawing Figures

4,076,411

APPARATUS AND METHOD FOR MAKING PRINTS

BACKGROUND OF THE INVENTION

1. Field Of The Invention

This invention relates to an apparatus and a method for the controlled exposure and processing of a sheet, for example a photosensitive sheet.

2. Description Of The Prior Art

In U.S. Pat. Nos. 3,801,321 and 3,893,860 there are described sensitized materials, such as photosensitive paper, which may be selectively exposed by appropriate actinic radiation to form latent images thereon and which images may be developed by subjecting the materials to a specified temperature for a controlled period of time. Typically, a sheet of a sensitive material is withdrawn from a roll, metered to an exposure station, severed from the roll either prior to or after exposure and exposed for a suitable period. After exposure, the exposed sheet is directed into a processing or developing station which may illustratively take the form of a heating assembly. It is known to provide the necessary heat to develop the sheet by feeding the sheet upon a rotating and heated drum so that, through contact of the sheet with the drum, sufficient heat is transferred to the sheet to develop the image thereon. The time for heat development of the sheet is generally an important factor in the processing of the photosensitive materials to which reference has been made. In this regard, processing of any portion of a sheet is considered to commence when such portion has been placed into contact with the heated drum. To provide for uniform processing of a sheet on a drum, the drum is rotated at a carefully controlled rate and sheet entrance and exit devices are arranged about the drum so that the first portion of a sheet is the first to contact and to be removed from the drum with succeeding portions of the sheet following in turn. Thus each portion of the sheet is in contact with the drum for the same total time as any other portion.

In providing for an apparatus to make prints it is desirable that the apparatus be compact and have the capability of providing successive finished prints with a minimum of waiting time between them. In U.S. Pat. No. 3,640,198 it is recognized that the time between successive prints may be reduced by varying the speeds at which the sheet is moved through the apparatus. Thus the sheet may be removed from the exposure station into the processing station at a relatively high rate, slowed to a relatively low rate while in the processor and accelerated to a relatively high rate during removal from the processor. While this apparatus works well and may indeed reduce access time between successive prints an additional motor or some other means for varying speed must be provided to permit the sheet to be moved through the processor at more than one speed.

It is therefore an object of this invention to provide an apparatus and method for making prints which features a relatively low access time between successive prints without the need for rotating a processing drum at at least two differing speeds.

It is a further object of the invention to provide an apparatus and method for making prints which permits such apparatus to be of relatively small size.

SUMMARY OF THE INVENTION

The invention provides for an improved apparatus and method for making prints wherein a sheet may be exposed at an exposure station to form a latent image thereon and wherein such image is processed in a processing station by having the sheet supported on a rotating drum. To minimize the size of the apparatus and to reduce the time between successive prints the invention proposes that each portion of the sheet be maintained on the drum for more than one complete revolution of the drum. By permitting the sheet to remain on the drum for more than one revolution, the drum rotational speed may be set at a higher rate relative to conventional apparatus wherein the sheet is supported for less than one revolution upon the drum. The increase in rotational speed suggested by the invention advantageously permits an exposed sheet to be quickly removed from the exposure area thereby hastening the introduction of the next succeeding sheet into the exposure station and reducing the time differential between finished prints.

The invention and other objects and advantages thereof will become more apparent in the detailed description of the preferred embodiments presented below.

BRIEF DESCRIPTION OF THE DRAWINGS

In the detailed description of the preferred embodiments of the invention presented below, reference is made to the accompanying drawings, in which.

DESCRIPTION OF THE PREFERRED EMBODIMENT

Figure 1:
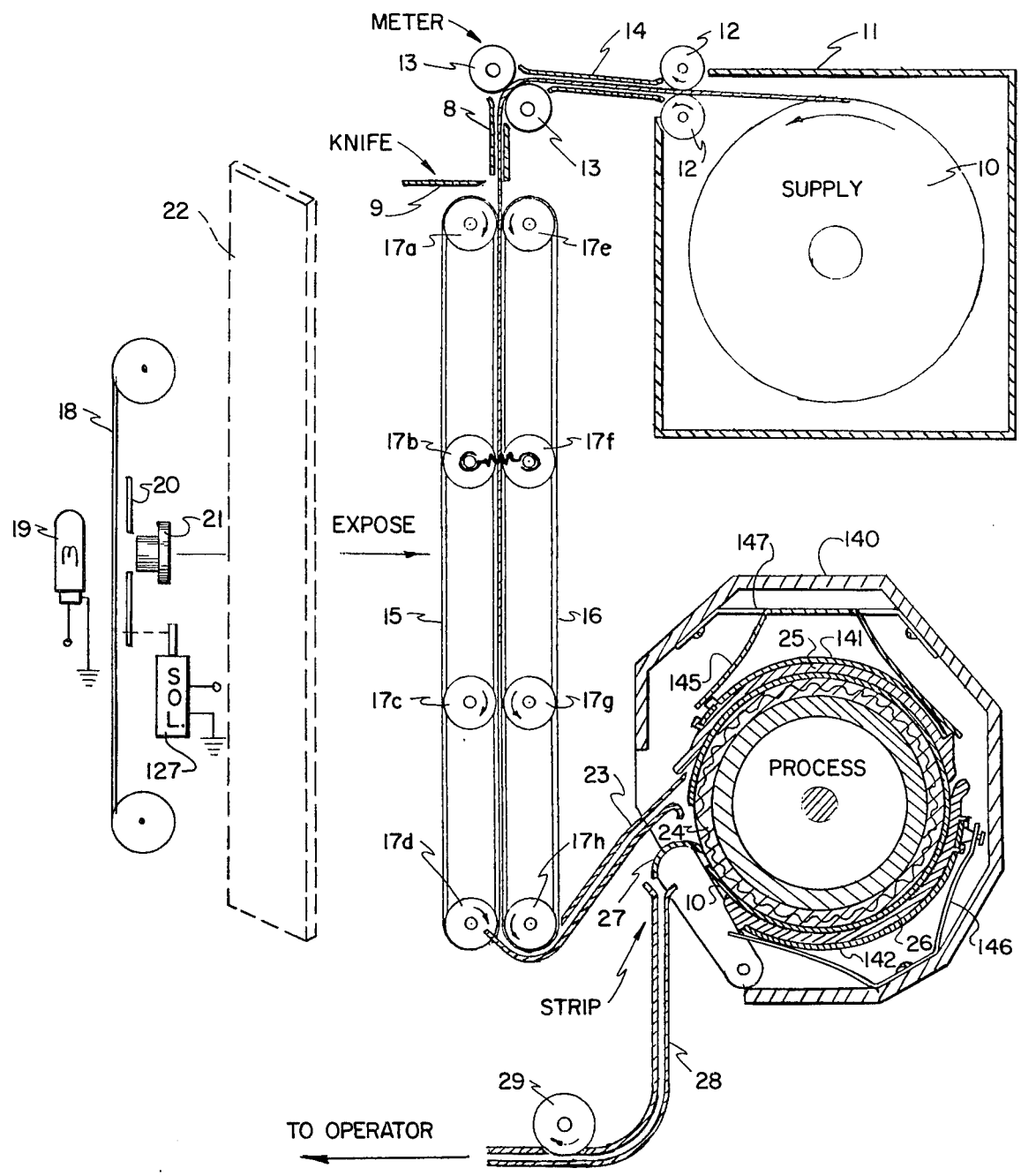
FIG. 1 is a diagrammatic representation of a rightside elevational view of an apparatus constructed in accordance with the teachings of the invention, the view being a sectioned one to illustrate the internal portions of the apparatus.

Referring now to the drawings and in particular to FIG. 1 there is shown an apparatus for making prints which is adapted to receive a supply roll of photosensitive paper 10 preferably of the kind referred to in U.S. Pat. Nos. 3,801,321 and 3,893,860. The roll of paper is suitably supported in an openable, light-tight housing 11. The paper may be threaded from the housing between a pair of pinch rollers 12, driven metering rollers 13 and guides 14 and 8 which guide the paper to an exposure station. The pinch rollers 12 serve to provide tension to the sheet when it is driven by the metering rollers 13. As may be noted from FIG. 1 the roller pairs and guides are located on opposite sides of the sheet. Those elements contacting or facing the emulsion surface of the sheet are referred to herein as "upper" elements while those contacting or facing the back of the sheet are referred to as "lower" elements. The upper rollers and guide elements may be located on a movable frame to permit the frame with its rollers and guide elements to be lifted away from the lower rollers and guide elements to facilitate initial threading of the paper 10 into the apparatus such as when introducing a new roll into the housing 11. Immediately downstream of sleeve element 8 is a knife blade 9 which extends transversely to the direction of movement of the paper and which when actuated cooperates with an extending lip on the lower sleeve element 8 to sever the paper into a desired length.

The exposure station is comprised of opposing pairs of rollers 17a, 17e; 17b, 17f; 17c, 17g; 17d, 17h; which are spring biased towards each other. Endless band 15 is entrained about rollers 17a, b, c and d and endless band 16 is similarly associated with rollers 17e, f, g and h. The rollers and bands are of only narrow width and located (see FIG. 3) to only make driving contact with a narrow edge portion of a sheet to be exposed. Corresponding sets of rollers and belts are located at each of the sheet side edges and on both surfaces of a sheet. With a sheet supported at the edges between the upper pair of bands 15 and the lower pair of bands 16 no obstruction is presented for exposing the central portion of the sheet. Each pair of transversely spaced upper belts 15 and each pair of transversely spaced lower belts 16 may be supported so that each belt in a transversely spaced pair slightly diverges away from the other in the direction in which the sheet is to be fed to ensure proper transverse tension on the sheet when supported for exposure. The printer is preferably adapted to form enlarged prints of information photographed on microfilm 18 and thus may include an artificial source of light 19, a solenoid actuated shutter device 20 and a suitable lens 21 that is adapted to project an enlarged image of a microfilm frame upon the photosensitive surface of a sheet supported in the exposure station.

Upon actuation of the apparatus' control mechanism (to be described below) the paper 10 is driven by the metering rollers 13 between belt pairs 15 and 16 so that the appropriate length is metered into the exposure station and cut to the desired length, say 5½ or 11 inches. As is conventional, the printer may have associated therewith a movable mirror 22 placed angularly between the lens and the belts 15 which mirror serves to reflect onto a suitable viewing screen an image of the frame of the microfilm to be copied. The mirror is removed from the exposure area during exposure of the sheet. After an exposure period of say 2 seconds, the controls again actuate the movement of the sheet towards the processor portion of the printer. The exposed sheet is guided into the processor by a guide 23.

In the preferred embodiment the processor is in the form of a rotatable cylindrical drum 24 with heated shoes or platens 25, 26 supported about its periphery. The drum is preferably made relatively small and may have a perimeter approximately the same as or preferably moderately greater than the length of the largest sheet to be processed so that an entire sheet may be supported on the drum without overlapping of the sheets transverse leading and trailing edges. The sheet is guided into the processor so as to be presented between the drum and the shoe or platen 25. The leading edge of the sheet contacts and thereafter moves with the rapidly turning drum (about one revolution every two seconds) so that the entire exposed sheet is quickly removed from the exposure station with each portion of the sheet being taken up in turn onto the processing drum. The fast take-up of the sheet into the processor permits the next sheet to be admitted to the exposure station. Thus while one sheet is being processed the next may be metered and exposed. In as much as the paper to be processed requires a processing time that is longer than the time in which the processor drum 24 turns through one revolution, the control mechanism provides for removal of the sheet from the drum after each portion of the sheet has been on the drum for more than one revolution of the drum. In this regard a stripper element 27 is so actuated as to contact the drum immediately prior to when the leading edge of the sheet passes by the stripper element at about the end of the sheets second revolution on the drum and the sheet is thereafter stripped from the drum by the stripper 27 and guided through a guide 28 to an area where it is accessible to the operator. Advancement towards the operator is further assisted by a series of drive rollers 29 which receive their drive from an electrical motor 30 via a first pulley wheel 29a, a belt 29b and a second pulley wheel 29c (see FIGS. 2 and 3).

Figure 2:
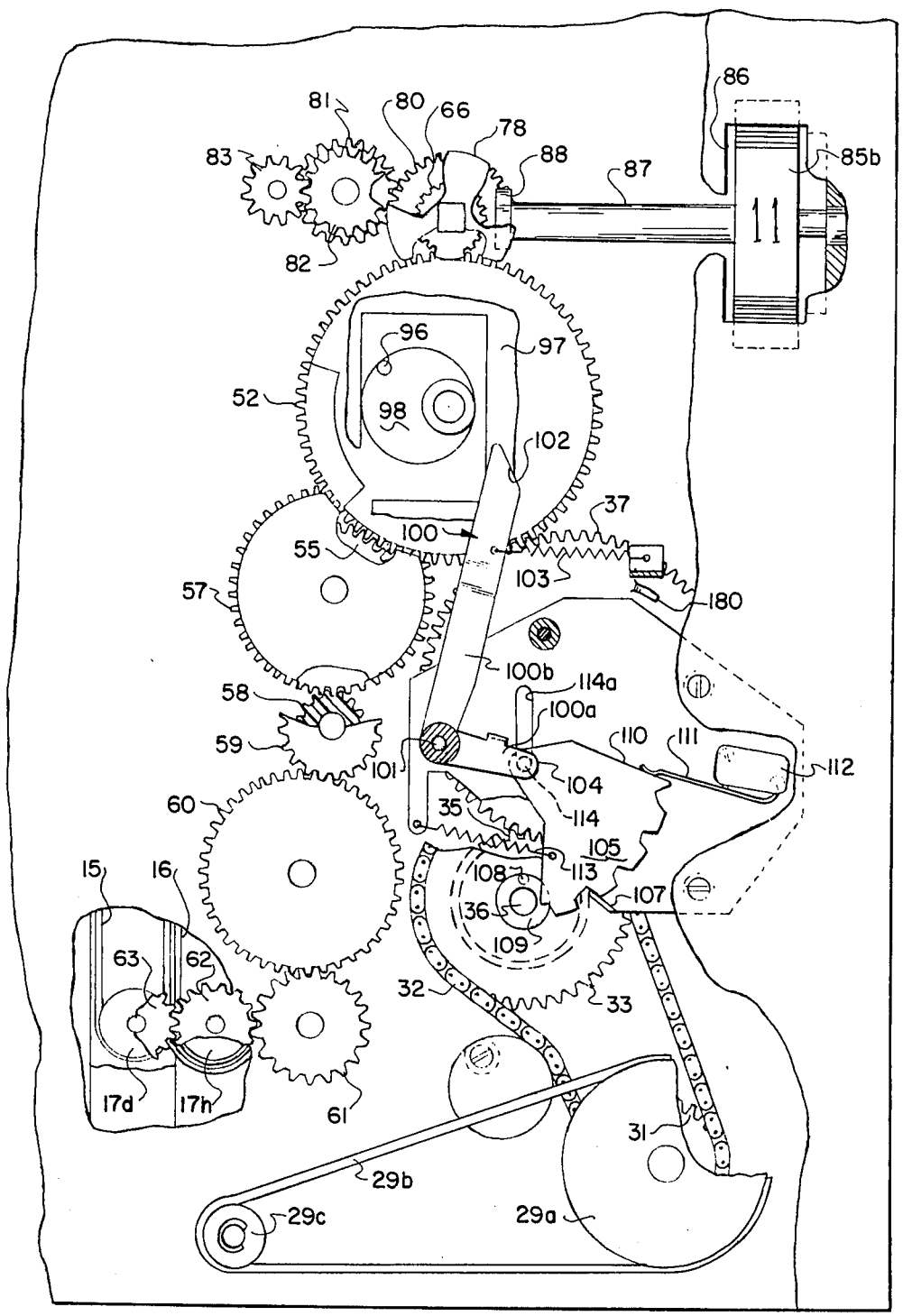
FIG. 2 is a right-side elevational view, partially cutaway, of the apparatus of the preferred embodiment.
Figure 3:
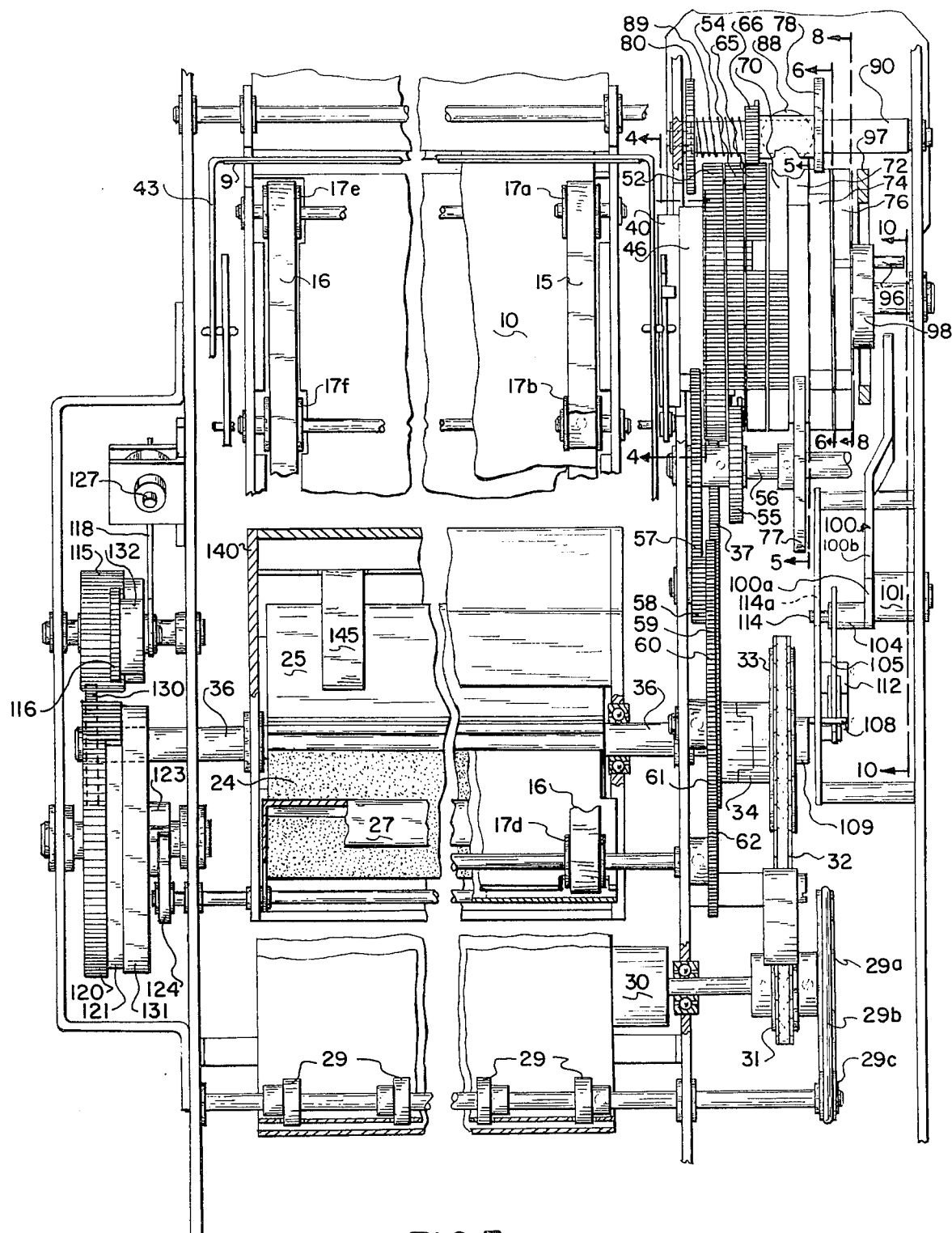
FIG. 3 is a front elevational view, partially cutaway, of the apparatus of the preferred embodiment.

With further reference to FIGS. 2 and 3, the electrical motor 30, through a coaxial sprocket wheel 31, also drives a roller or sprocket chain 32 that is entrained with a second but larger sprocket wheel 33. Coaxial with sprocket wheel 33 is an electrical clutch 34 which when actuated is adapted to couple the drive from motor 30 to a gear 35. Sprocket wheel 33 is rigidly coupled to a shaft 36 which extends through the clutch 34 and to which the processing drum 24 is attached. Thus the drive to the processing drum is not affected by actuation or deactuation of the clutch while the drive to gear 35 is so affected. Coupled to gear 35 is a larger gear 37 which is further coupled to the cycle timing mechanism of the apparatus. Thus the cycle timing mechanism will only be motivated with actuation of the clutch 34 and motor 30.

The cycle timing mechanism comprises a multiple number of coaxial elements which elements are rotated together and through such rotation control various functions of the apparatus. For each 360° rotation of the cycle timing mechanism a sheet will be metered into the exposure station; cut to a desired size, exposed and advanced out of the exposure station and onto the processing drum. Beginning at the left as shown in FIG. 3 the cycle timing mechanism includes a knife cam wheel 40 (see also FIGS. 4A and 4B) which cooperates with a spring-biased knife cam follower 41 to maintain the knife blade 9 in raised position and to actuate same to cut the sheet at a specific time in the print cycle. The knife cam follower 41 is rigidly coupled by a connecting member 42 to a pivotable yoke 43 upon which the knife 9 is supported.

Figure 4A:
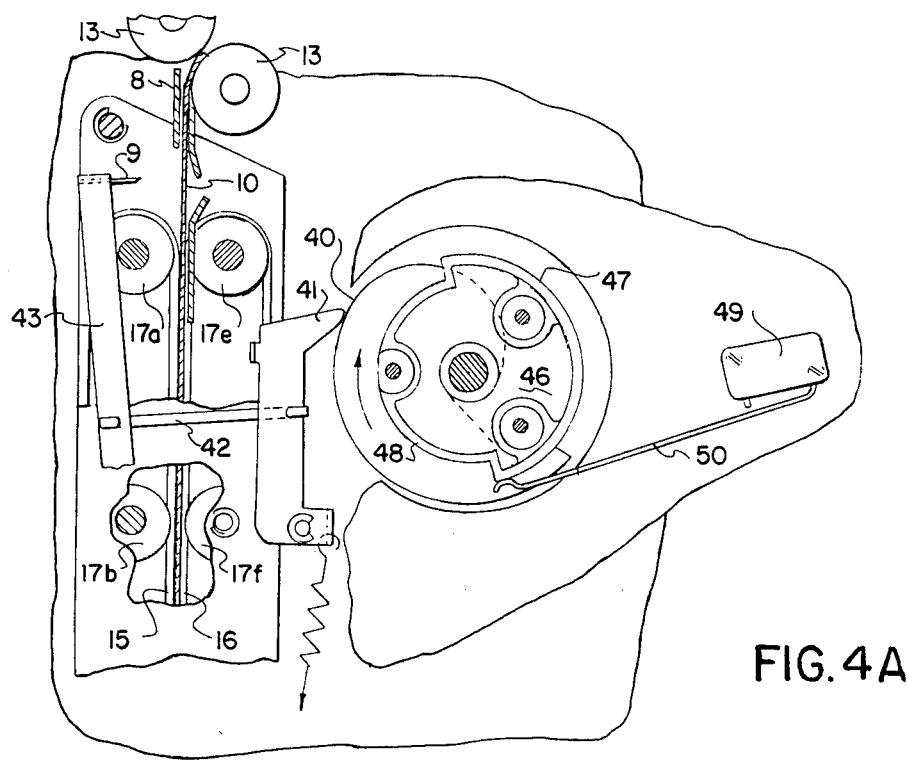
FIG. 4A is a close-up view of a section of the apparatus of FIG. 3, the section being taken on the line 4—4 of FIG. 3.
Figure 4B:
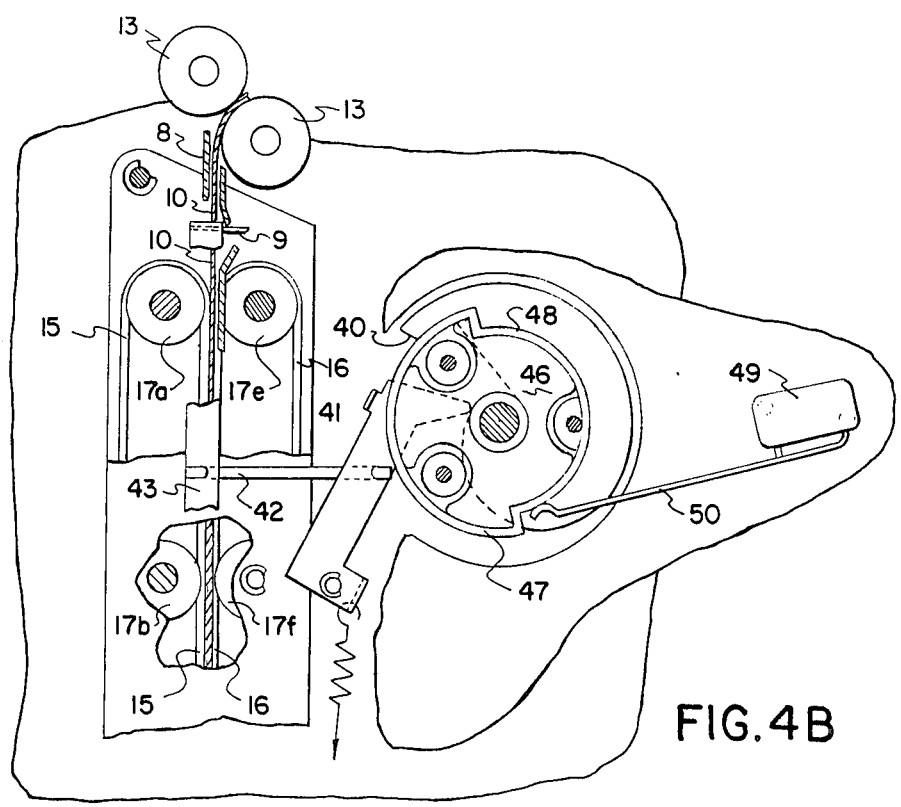
FIG. 4B is a view identical to that of FIg. 4A but illustrating a later time in the print cycle of the apparatus.

The second portion of the cycle timing mechanism is a cycle timing switch cam 46 which includes a high segment 47 and a low segment 48 (see also FIGS. 4A and 4B). A switch 49 is located proximate to the cam 46 and has a switch arm 50 which is adapted to place the switch in a first conducting mode when the arm is in contact with the high segment 47 and place the switch in a second conducting mode when in contact with the low segment 48. The usefulness of switch 49 will be further discussed when considering the operation of the electrical circuitry.

Figure 5A:
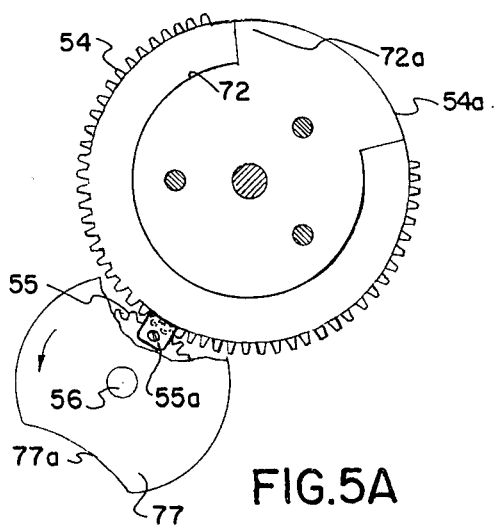
FIG. 5A is a close-up view of a section of the apparatus of FIG. 3, the section being taken on the line 5—3 of FIG. 3.
Figure 5B:
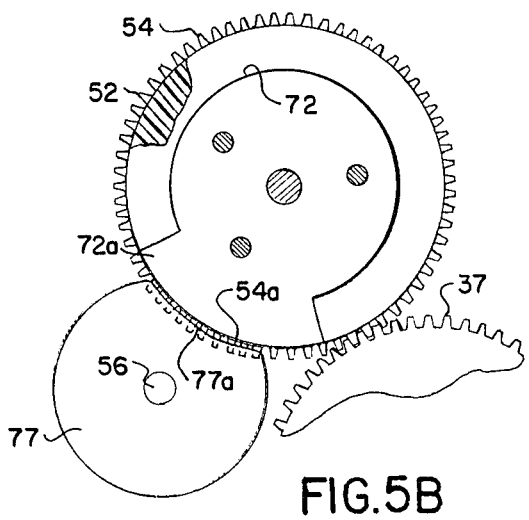
FIG. 5B is a view similar to that of FIG. 5A but illustrating a later time in the print cycle of the apparatus and adding some extra detail.

The third portion of the cycle timing mechanism is a gear element 52 which meshes with gear 37 and is configured as a normal spur gear (see also FIG. 5B). Gear element 52 when driven by gear 37 causes the other elements on the cycle timing mechanism to move through the print cycle.

Adjacent gear element 52 is the fourth element of the cycle timing mechanism, the sheet transport segment gear 54 (see also FIG. 5A). This gear through the train of gears to be described drives the rollers 17a–h which in turn drive the upper and lower belt pairs 15 and 16. As indicated previously these belts serve to receive the photosensitive sheet from the metering rollers 13 and transport the sheet so that it is supported in the exposure station between the two upper and lower belt pairs. After exposure of the sheet the belt pairs are again actuated to drive the sheet from the exposure station and onto the processing drum 24. The gear 54 is referred to as a segment gear because it does not contain its full complement of gear teeth as does a normal spur gear. Rather a segment 54a of the gear 54 is made with a smooth surface about the root radius thereof so that during rotation of the entire cycle timing mechanism a dwell period will be created vis-a-vis the segment gear 54 and the specific elements which receive their drive from this gear. This period of dwell will correspond with the length of the toothless segment 54a. With reference to FIGS. 2, 3 and 5A it may be seen that segment gear 54 is engaged with a smaller spur gear 55. Spur gear 55 has one-half the number of teeth of segment gear 54 and therefore rotates twice for each revolution of the segment gear 54. Spur gear 55 will not be driven when opposed by the toothless segment 54a. At the commencement of each cycle of the cycle timing mechanism, drive is imparted to the mechanism and hence to the segment gear 54. At this time spur gear 55 is in opposition with the toothless segment 54a but about to be contacted by the first tooth of segment gear 54. To strengthen the spur gear 55 for initial contact with the segment gear 54 and to minimize backlash a similar portion of each of the first three teeth of the spur gear 55 are extended radially so as to almost contact the toothless segment 54a of the segment gear 54. In addition, in such portion the spaces between the three teeth are "filled in" so that in appearance the radially extended portion comprises a single extended lobe-like tooth 55a having the circumferential length of about three normal teeth on spur gear 55. Such a gear may be fabricated by removing completely those portions of the teeth of three gear teeth which are adjacent to one edge of a gear and adding in place of the removed gear teeth portions an extended lobe-like tooth. The extended tooth 55a may be made of metal even though the gear to which it is assembled and the gear with which it meshes is made of plastic. In order to join the metal lobe to the gear, the lobe may be provided with a dependent portion which is adapted to be screwed into a niche machined into the side face of the gear. Since there are half as many teeth on gear 55 as compared with the number of teeth on segment gear 54, the extended tooth portion will in addition to the initial engagement also be opposed once during each cycle of segment gear 54 with the toothed segment of gear 54. So that the two gears may properly mesh, the segment gear 54 (see FIG. 5A) has portions of several teeth removed at about the midpoint of the toothed segment 54 to preclude an interference with the extended tooth 55a of spur gear 55.

Spur gear 55 is keyed to shaft 56 which also has keyed thereto a larger gear 57 (see FIGS. 2 and 3). Other gears 58, 59, 60, 61, 62 and 63 cooperate with gears 55 and 57 to comprise the gear train which couples segment gear 54 to the belt rollers 17d and 17h.

Figure 6A:
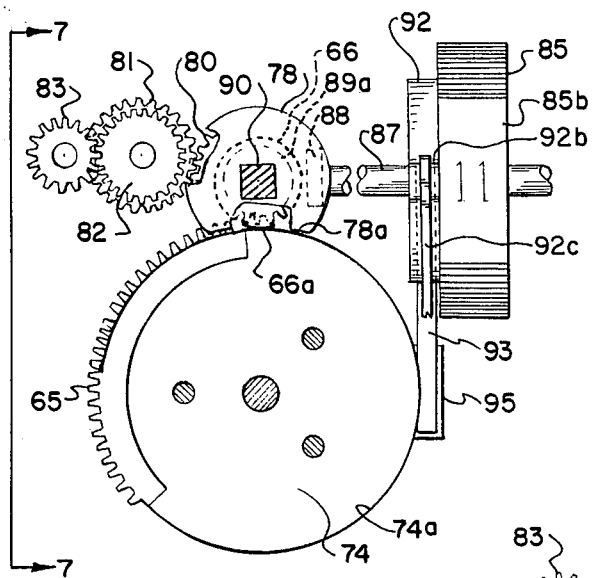
FIG. 6A is a close-up view of a section of the apparatus of FIG. 3, the section being taken on the line 6—6 of FIG. 3; some detail being omitted for purposes of enchancing the clarity of the description.
Figure 6B:
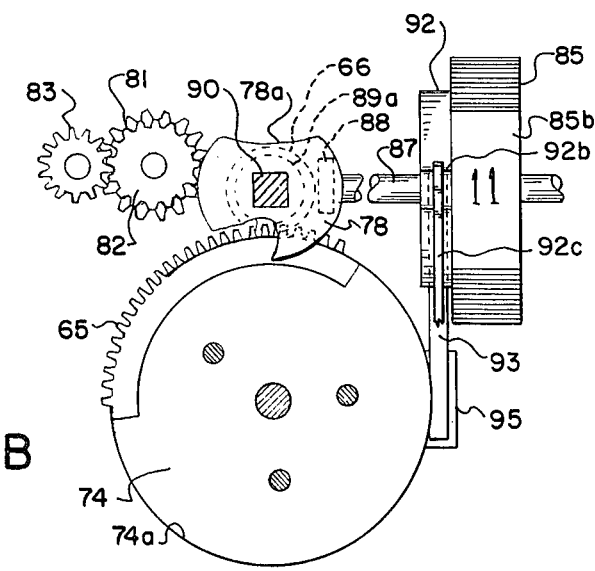
FIG. 6B is a view identical to that of FIG. 6A, but taken at a later time in the print cycle of the apparatus.
Figure 7:
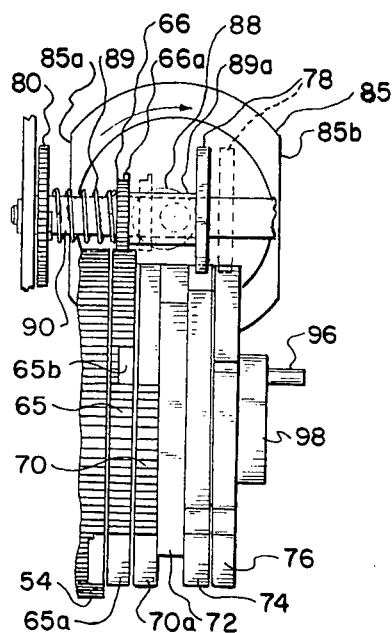
FIG. 7 is a view of the apparatus taken along the line 7—7 of FIG. 6A.

Adjacent the segment gear 54 is the fifth part of the cycle timing mechanism, the 11 inch metering segment gear 65, which through the drive train to be described drives the lower metering roller 13. As indicated in FIGS. 2, 3, 6A and 6B, metering segment gear 65 meshes with a smaller gear 66 and includes only a sufficient number of gear teeth to rotate the gear 66 twice for each revolution of the cycle timing mechanism. The remainder of the surface of metering segment gear 65 is without teeth and thus the smaller gear 66 will be idle for a period represented by the non-tooth bearing portion 65a of metering segment gear 65. To facilitate the engagement of the respective gear teeth of metering segment gear 65 and smaller gear 66, the smaller gear has three of its teeth at one side or portion 66a thereof extended and "filled in" in similar fashion to gear 55. In FIG. 7 it will be noted that at the midpoint 65b of the toothed portion of the metering segment gear 65, teeth have been partially removed therefrom. The absence of teeth at this portion is to allow the extended and filled in teeth portion 66a of gear 66 to mesh with this toothless portion.

Figure 8A:
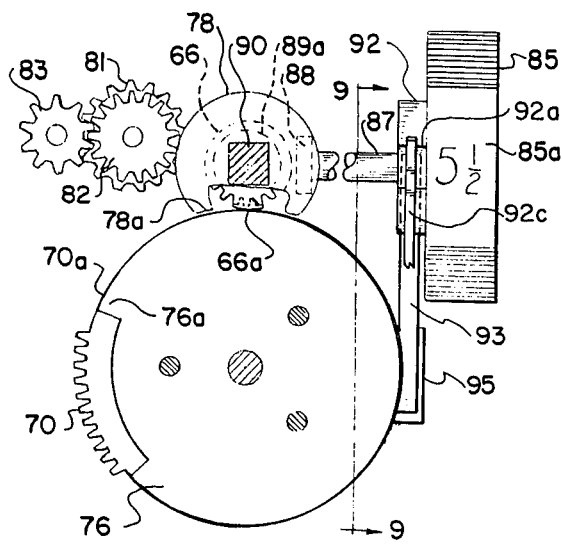
FIG. 8A is a close-up view of a section of the apparatus of FIG. 3, the section being taken on the line 8—8 of FIG. 3.
Figure 8B:
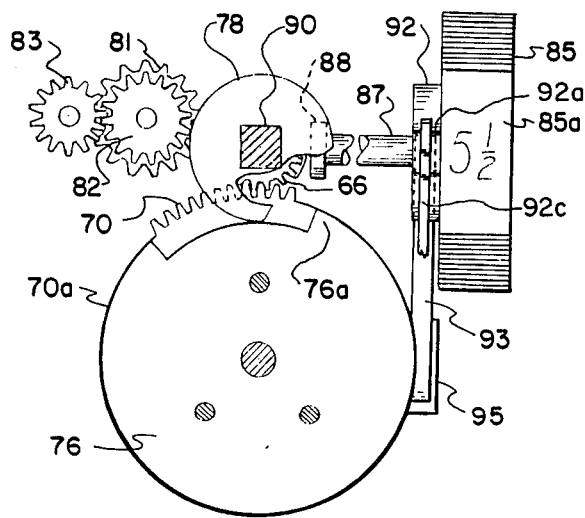
FIG. 8B is a view identical to that of FIG. 8A but taken at a later time in the print cycle of the apparatus.
Figure 9:
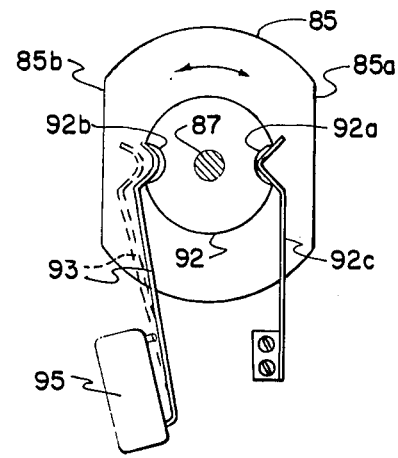
FIG. 9 is a view of the apparatus taken along the line 9—9 of FIG. 8A.

The sixth portion of the cycle timing mechanism is located adjacent the fifth portion thereof and comprises the 5½ inches metering segment gear 70 (see FIGS. 3 and 8A and 8B). By moving gear 66 axially to the right in FIG. 7 the gear 66 will engage with the 5½ inches metering segment gear 70. Segment gear 70 has the same number of teeth as gear 66 and thus gear 66 will rotate only once for each revolution of the cycle timing mechanism when meshed with this segment gear. Thus a correspondingly shorter sheet will be metered into the exposure station when gear 66 is driven by segment gear 70. Metering gear 70 also has a portion 70a thereof which has no teeth and gear 66 when engaged with this metering gear will be idle for a portion of each revolution of the cycle timing mechanism represented by such toothless portion. It should be noted that the gear elements 52, 54, 65 and 70 may be made advantageously in one unit of the same diameter with common teeth that extend laterally into selected portions of all four elements.

The two gears 55 and 66 are intended not to be driven or moved during certain idle portions represented by respective toothless segments on the gear elements of the cycle timing mechanism. It is desirable, therefore, to provide appropriate restraining means to preclude accidental rotation of these two gears. To this end, there is provided on the cycle timing mechanism three gear lock elements 72, 74 and 76 which are laterally adjacent to each other (see FIGS. 3, 5A, 5B, 6A, 6B, 7, 8A and 8B). Each of these gear lock elements comprises a cam with a raised circular portion 72a, 74a and 76a, respectively and which raised portion is of a peripheral length corresponding to the idle or toothless portion of segment gears 54, 65 and 70 respectively. The raised circular portions 72a, 74a and 76a are aligned respectively on the cycle timing mechanism with corresponding toothless portions of gears 54, 65 and 70. Cooperating with gear lock element 72 (see FIGS. 3, 5A and 5B) is a gear hub 77 keyed with gear 55 to shaft 56 and spaced axially from gear 55. Gear hub 77 is generally circular except for a concave segment 77a which is provided on a portion of its periphery. As will be noted from the views shown in FIGS. 5A and 5B the gear hub 77 is free to rotate when gear 55 is driven by segment gear 54. However, when the toothless portion 54a of segment gear 54 is in opposing relationship to gear 55 the gear 55 is locked or prevented from further rotation by virtue of the arrival of the raised portion 72a of the gear lock 72 and the concave portion 77a of gear hub 77 (see FIGS. 5A and 5B). During the period when gear 55 is locked, the cycle timing mechanism including gear lock 72 continues to rotate and once the raised portion 72a is no longer opposing the gear hub's concave portion 77a, the gear 55 is free to rotate upon engagement with the teeth of the segment gear 54.

The locking of gear 66 is similar to that of gear 55 except that since gear 66 is movable between metering segment gears 65 (11 inches drive) and 70 (5½ inches drive), its corresponding coaxial gear hub 78 is movable therewith and is therefore associated with two gear lock cams 74 and 76. In FIG. 6A (11 inches mode) the raised portion 74a of the gear lock 74 is shown presented to or in opposition with a concave portion 78a of gear hub 78. In this mode gear 66 is prevented from rotation until a time when the raised portion 74a is moved away from opposition with concave portion 78a (see FIG. 6B). At such time the extended lobe 66a of gear 66 will initiate meshing engagement with gear element 65 of the cycle timing mechanism and gear 66 will be driven and in turn drive gears 80, 81, 82 and 83, the latter of which is keyed to the same shaft as the lower one of the metering rollers 13. In FIGs. 8A and 8B the sector gear 66 is shown in the 5½ inches mode wherein, in the first of such views, it is in the locked position with raised portion 76a of gear lock 76 opposing concave portion 78a of gear hub 78. In FIG. 8B the raised portion 76a of gear lock 76 has moved out of opposition with the concave portion 78a (not shown in this view) to thereby unlock gear 66 and to thereby enable the metering of a paper length of 5½ inches into the exposure station.

With particular reference to FIGS. 6 through 9 a mechanism is described that will permit a person operating the apparatus to adjust the apparatus for exposure of a sheet whose length is one of either of two sizes. The mechanism includes a rotatable disc-like handle 85 which extends from the cabinet covering the apparatus and which handle has two oppositely facing flattened segments 85a, 85b formed on the disc-periphery. Only one of these segments is visible to the operator at any one time through window 86 (FIG. 2). Suitable indicia may be printed on the flattened segments to denote the respective sheet length which the apparatus has been set to provide. The handle 85 is supported on a shaft 87. At one end there is also supported on this shaft an eccentrically mounted circular cam 88. By rotating handle 85, cam 88 is actuated to rotate between opposed side faces of gear 66 and gear hub 78, and a high portion of cam 88 will force gear hub 78 and with it gear 66 axially to the right (shown in phantom in FIG. 7). so as to place such elements in the 5½ inch mode. Rotation of the handle 85 so that the low portion of cam 88 is in contact with a side face of gear hub 78 permits gear 66 and gear hub 78 to be moved axially to the left in FIG. 7 under the force of a spring 89. In this regard it should be noted that gear 66 and gear hub 78 are attached to each other by a sleeve 89a which like gear 66 and gear hub 78 has a square hole extending through its center such that the sleeve 89a gear 66 and hub 78 may be moved axially over and along a square shaft 90. Shaft 90 is rotatively supported by the frame of the apparatus and its square cross-section cooperates with the square hole through gear 66, gear hub 78 and sleeve 89 so as to key the shaft 90 for rotation with these elements. Therefore, rotation of gear 66 will cause shaft 90 to rotate which in turn will rotate gear 80 which is also keyed to shaft 90 but which is not movable axially along shaft 90.

In order to lock cam 88 in either of the two positions that establish the desired paper length to be metered, the handle 85 has on its inside face a generally circular cam disk 92 (FIG. 9) which includes two cutouts 92a and 92b which comprise detents in which may be received spoon-like springs 92c and 93. Springs 92c and 93 have their bowl-like portions adapted to mate with the cutout portions 92a and 92b to provide a positive lock to the axial orientation of gear 66 and gear hub 78. Spring 93 is also part of a switch 95 whose function will be described in conjunction with the other electrical components of the apparatus.

Returning now to FIGS. 2 and 3, the right hand portion (as viewed in FIG. 2) of the cycle timing mechanism includes two additional elements, a mirror eccentric cam 98 and an end-of-cycle actuating pin 96. The mirror eccentric cam has a frame-like follower member 97 surrounding it. Through the use of a suitable conventional linkage (not shown) between the follower member 97 and mirror 22 (FIG. 1) the mirror may be rotated from a position in which it blocks light from entering the exposure area (and simultaneously permits the operator to see an image of that which is to be printed) to a position in which light from source 19 may pass into the exposure area.

Figure 10A:
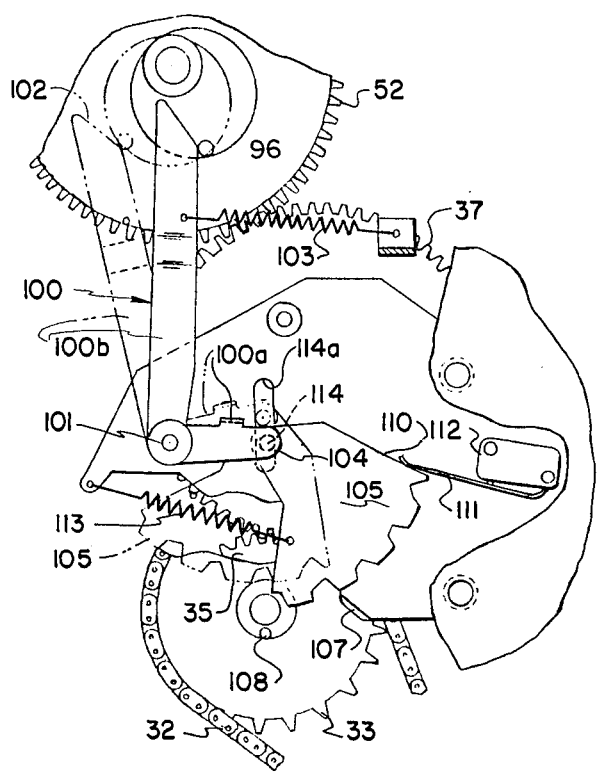
FIG. 10A is a view of a portion of the apparatus taken along the line 10—10 of FIG. 3 and additionally showing in phantom certain elements thereof in a second position to illustrate their operation.
Figure 10B:
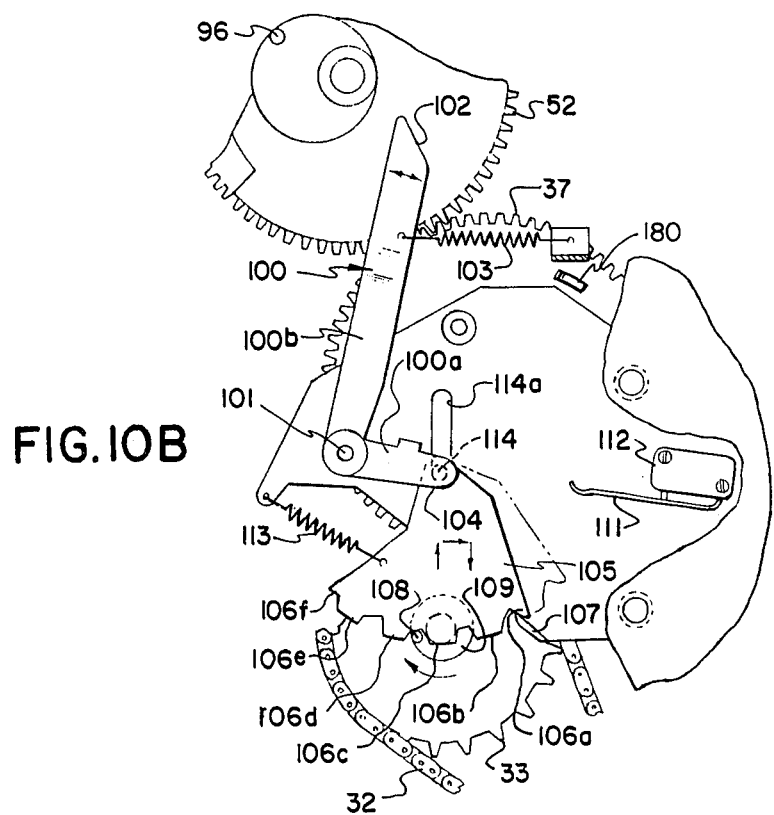
FIG. 10B is a similar view to that of FIG. 10A but showing the apparatus at later times in the print cycle.

The function of the end-of-cycle actuating pin 96 will now be discussed with reference to FIGS. 3, 10A and 10B. For each print that is metered, exposed and advanced to the processing station, the cycle timing mechanism makes one complete revolution so that the next print cycle can commence in accordance with the same sequence of events which such mechanism controls. However, the time necessary to process a sheet is such that additional revolutions of the drum are required after the cycle timing mechanism has completed one full revolution to ensure that a sheet will be properly processed and removed from the process drum. This is particularly important where the operator is interested in but one print or where some time is permitted to elapse from the time the machine indicates that the next print may be made to the time when the operator actually closes a switch to make such print. To ensure that a print has been provided sufficient processing time an end-of-cycle revolution counting mechanism is provided which is essentially independent of the cycle timing mechanism for one important factor of initiating its cycle. The revolution counting mechanism is comprised of a generally "L" shaped member 100 pivotably connected to the frame of the apparatus at the junction 101 of the member's base arm 100a and its upstanding arm 100b. At the end of arm 100b a ramp-like edge 102 is provided to cooperate with the end of cycle actuating pin 96. A spring 103 connects arm 100b to the frame and also biases the arm in the clockwise direction as viewed in FIGS. 10A and 10B. At about the end of base 100a there is a connection 104 which pivotably supports to the base 100a a generally plate-like counting foot 105 having toes 106a through 106e arranged generally along a circular segment the center of which is the pivotable connection 104. The pivotable connection 104 is located at about the heel of the foot. The foot 105 is connected to the frame of the apparatus by a spring 113 which biases the foot in a clockwise direction. At the connection 104, the inner face of the base has a pin 114 (see also FIG. 3) projecting therefrom which is located in and movable along a vertically extending slot 114a formed in the frame. Attached to the frame of the apparatus and also extending therefrom is an inclined latch bar 107 which is located adjacent to the toe portion of the counting foot 105 and cooperates with same during actuation of the counting mechanism so that for each revolution of the processing drum a toe is lifted to the right as viewed in FIGS. 10A and 10B over the latch bar 107 and set down so that the back-portion of the toe will rest against the latch and the mechanism will have thereby advanced or counted one revolution of the processing drum. In order to raise and lower each toe, inturn, over the latch an eccentrically mounted counting pin 108 is provided on a circular disk 109 that is supported for rotation with sprocket wheel 33 (and hence the processing drum). Since the latch 107 is laterally spaced from the orbit of counting pin 108 a toe will be lifted over the latch when counting pin 108 moves into a notch defined between the next two preceding toes and causes the pivotably mounted foot 105 to be raised, moved laterally and lowered during approximately 180° rotation of the counting pin 108.

At the start of the print cycle the end-of-cycle counting mechanism is in the "end-of-count position" position shown in FIG. 2 with a flat nose portion 110 located at the front of the first toe 106a urged or bearing against switch arm 111 of switch 112. The function of the switch will be more fully described in conjunction with the electrical controls of the apparatus; however, it may be briefly stated here that the switch provides an alternate route for power to the motor 30 and that such power may be provided when foot 105 does not bear against switch arm 111. In the aforementioned position the foot 105 is supported by latch 107 against rotation by the spring 113. As the end-of-cycle actuating pin 96 rotates there is a time, such as at about the half way point in the cycle of the cycle-timing mechanism, wherein the pin moves against the ramp-like end 102 of arm 100b (see FIG. 10A) pivoting same about pivot 101 and thereby raising foot 105 totally above latch bar 107. Now that latch 107 no longer restrains the foot from the bias imparted by spring 113, the foot rotates clockwise about pivot 104 away from switch arm 111. After the pin 96 has rotated past arm 100b the arm is urged clockwise by gravity and spring 103, causing the foot to be moved downward into an initial counting position wherein the notch between toes 106c and 106d (see FIG. 10B) is in position to be entered by counting pin 108 and the latch is located in the notch between the toes 106a and 106b. With continued rotation of the processing drum the rear three notches (the "half-notch" 106f at the left-end being considered a full notch) cooperate, in turn, to count-off three revolutions of the pin 108 (and hence the processing drum) until the position in FIG. 2 is reached wherein the nose portion 110 of the forwardmost toe 106a presses against switch arm 111 to deactivate switch 112. In the event that a print cycle is initiated during the count-out of the end-of-cycle counting mechanism, the arm 100b is so located during this count-out as to be in position to be tripped by pin 96 and to thereby initiate a new counting cycle.

Figure 15:
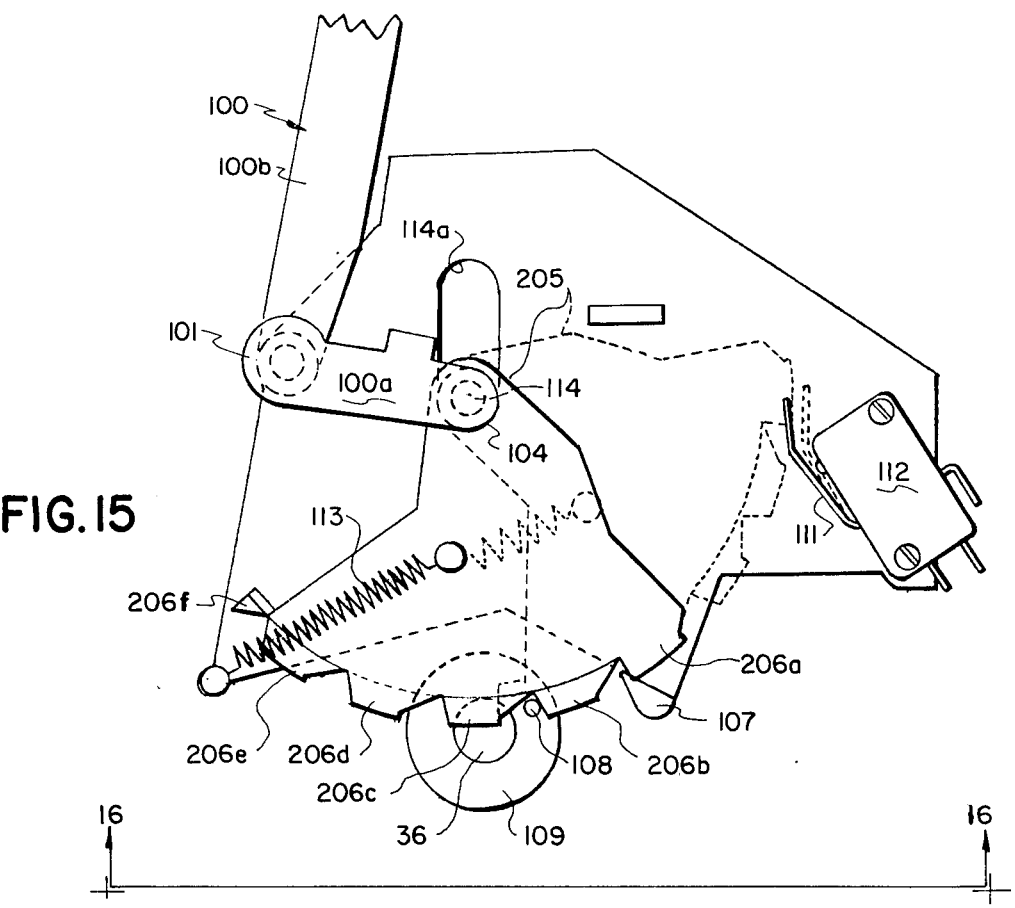
FIG. 15 is an elevational view of a modification to a portion of the apparatus and showing additionally in phantom certain elements thereof in a second position.
Figure 16:
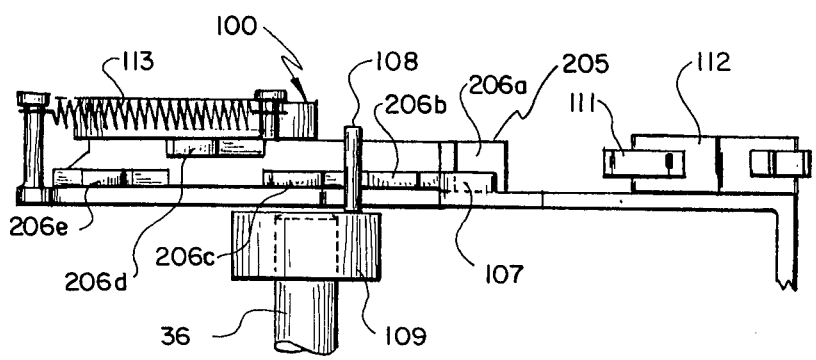
FIG. 16 is an end view taken along the line 16—16 of FIG. 15.

In FIGS. 15 and 16 a modified foot 205 is shown which differs from the one discussed previously in that the fourth toe 206d is not in the same plane as the other flat toes 206a through 206f but is instead offset from or located in a plane that is raised from the plane of the other toes. Because of the extended length of pin 108 the offset toe 206d will still be utilized in the same manner as the other toes in conjunction with counting pin 108. However, the latch bar 107 is not sufficiently long to catch the back portion of the offset toe 206d. The advantages of this modification are particularly useful when the foot is in the end-of-count position (shown in FIG. 2) wherein the fourth and fifth toes straddle the latch bar. In this position and during the first half of the print cycle the pin 108 is rotating and there is continued "wiping" of the pin 108 against the back or left edge of the foot 105 which may result in the repeated "head-on" striking of the fifth toe 106e against latch 107. With the modified offset toe configuration and in the end-of-count position the back of the third toe 206c rests against latch 107. Since the latch does not extend sufficiently forward to reach the fourth toe 206d the foot 205 in the end-of-count position is free to be moved along the internal notch between the third and fifth toes, 206c and 206e respectively. This extra distance eliminates possible "head-on" striking of the foot 205 against the latch 107. With the foot 205 supported on the latch by its third toe 206c when in the end of count position, the switch arm 111, during the first half of the print cycle, will not be continuously urged to deactivate switch 112. This is not important to the operation of the apparatus however, since what is important is that the switch 112 be deactivated at the end of the counting cycle which occurs when pin 108 moves within the notch defined between toes 206*e* and 206*f* and moves toe 206*d* past latch 107. Movement of toe 206*d* past latch 107 forces the front toe 206*a* against switch arm 111 thereby deactivating switch 112. This immediately removes power to the motor 30 and, assuming no new print cycle has been initiated, the pin 108 will stop rotating immediately and remain in a position illustrated in phantom in FIG. 15 such that the pin 108 holds the foot 205 against switch arm 111 with toe 206*d* past latch 107. With the commencement of a new print cycle, power to the motor 30 will again be restored via circuitry alternate to that of switch 112 and thus pin 108 will move out from the notch between toes 206*e* and 206*f*. As toe 206*d* cannot be blocked by latch 107, the foot pivots clockwise about pivot 104 under force provided by spring 113 until the rear portion of the toe 206*c* butts against the latch. Further rotation of the pin 108 results in the pin once again entering the last mentioned notch and causes the foot to be moved against the switch arm 111 and then away from the switch arm as the pin moves out from the notch. This sequence will continue until the pin 96 on the end-of-cycle mechanism strikes arm 100*b* and causes the foot 205 to assume an initial count position shown in FIG. 15. The counting of the revolutions of the pin 108 will then commence in accordance with the description set forth above. It will be noted that in the modified embodiment the half-notch located at the rear of the foot 105 has been modified to a full notch by the addition of a sixth toe 206*f*. This full notch functions in a similar manner to the half-notch of foot 105.

Reference will now be made to FIGS. 3, 11, 12, 13A and 13B for a discussion of the structure and operation of the stripper timing mechanism which selectively actuates the stripper element 27. The stripper element is to be actuated (i.e. placed against the drum for removal of a processed sheet) once during a print cycle and is required to remain in such position for a time sufficient for a complete sheet to be removed from the processing drum. At other times during the print cycle the stripper element is preferably situated out of contact with the drum surface to allow the sheet to travel with the drum for more than one revolution of the drum and to avoid forming depressions in the drum surface.

Figure 11:
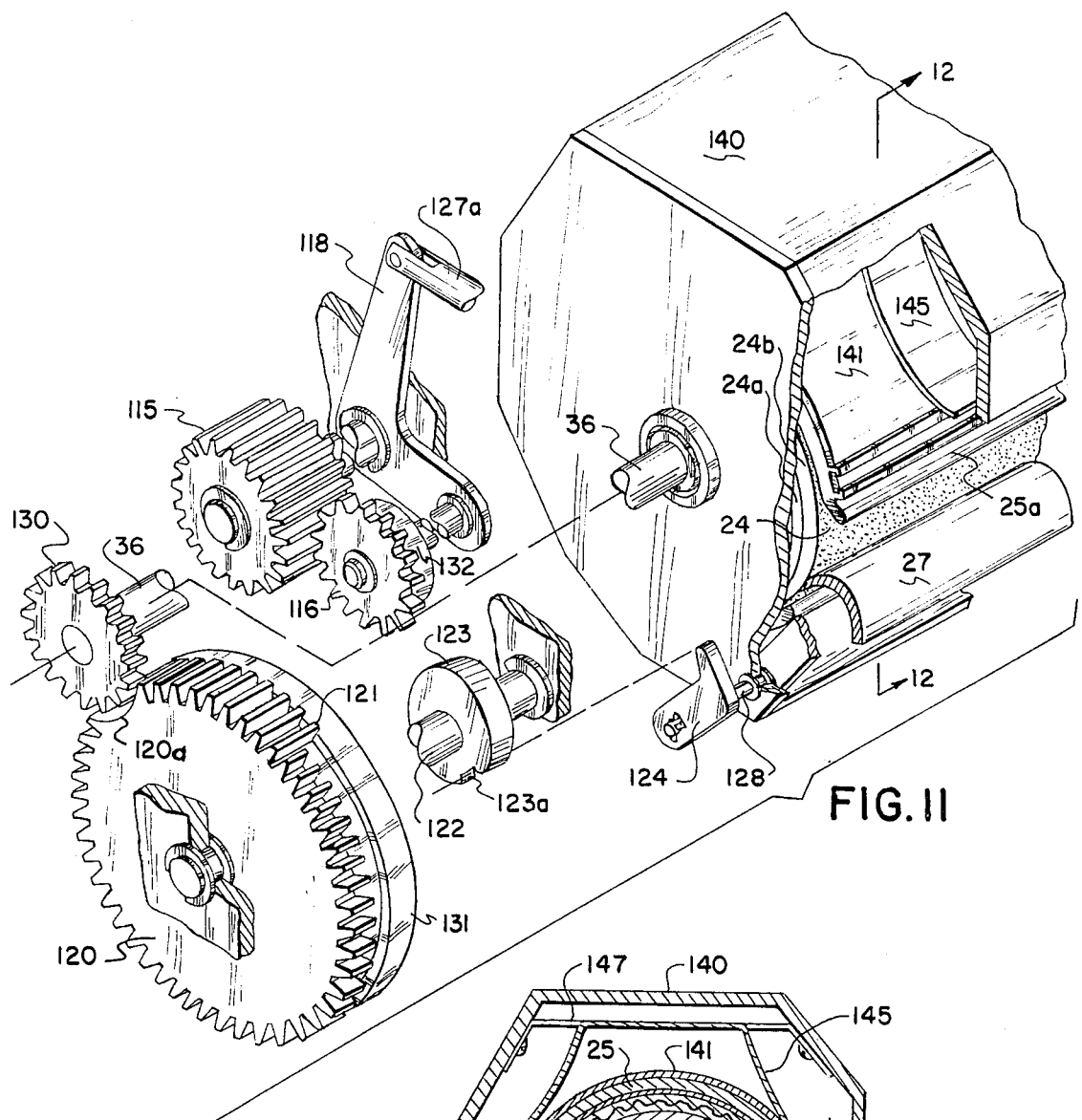
FIG. 11 is an exploded perspective view of a portion of the apparatus shown at the left in FIG. 3.

The mechanism to control the stripper element includes timing gear 120 which is supported on a shaft 122 with and adjacent to a segment gear 121. Segment gear 121 has gear teeth on only a portion of its periphery. Gears 120, 121 are of the same diameter and may have their respective teeth aligned as shown in FIG. 11. Timing gear 120 is fully toothed except for a concave segment 120*a*. A cam 123 is also mounted on shaft 122 for rotation with gears 120 and 121. A cam follower 124 is associated with cam 123 and is keyed to a shaft 128. Also keyed to shaft 128 is the stripper element 27. The stripper element 27 is supported at each end of the processing drum by arm 129 which is keyed at one end thereof to the shaft 128. When the curved plate that comprises the stripper element is placed axially against the drum surface, further rotation of the leading edge of a print is blocked and a curved path is provided for leading the sheet into the exit guide 28 which guides the sheet to a bin in which the sheet may be stored prior to removal by the operator. Also associated with the stripper timing mechanism is a gear 130 which is keyed directly to the shaft 36 which rotates the processing drum. As indicated previously, the drum is rotated directly by the drive motor 30 through a sprocket wheel 33 and is not affected by actuation or deactuation of clutch 34. Gear 130 meshes with timing gear 120 and is adapted to drive same except when opposed by the concave segment 120*a*. A solenoid 127 is also provided and an armature 127*a* thereof is secured to an arm of an "L" shaped lever 118. Actuation of armature 127*a* is adapted to urge the lever 118, which is pivotally mounted to the frame of the apparatus at the junction of the arms of the "L", to pivot clockwise (FIGS. 13A and 13B) against the bias of a spring 119 so that a tripping gear 116 located at the end of the other arm of the member 118 may move into meshing engagement with segment gear 121. Tripping gear 116 is driven by gear 115 which is supported to be coaxial with the pivot of lever 118 and which is in turn driven by gear 130. It will be noted from FIG. 11 that gear 115 is sufficiently wide to be driven by gear 130 and to also drive tripping gear 116. The two gears, 130 and 116, are axially offset from each other so that at the appropriate time they may mesh with and drive gears 120, 121 respectively. Prior to pulsing of solenoid 127 the stripper timing mechanism is in the position shown in FIG. 13A with gear 130 in opposed relationship with the concave segment 120*a*. After pulsing of solenoid 127, which occurs after completion of the exposure of the print and just prior to the end of the print cycle, driven gear 116 engages with and rotates segment gear 121. Timing gear 120 also rotates because it is coupled for rotation with gear 121. The driving engagement between gears 116 and 121 lasts for a time sufficient to move the concave segment 120*a* from opposed relationship with gear 130. Gear 130 is now able to mesh with timing gear 120 and drives same for one complete revolution until again opposed by concave segment 120*a*. Since the solenoid 127 is pulsed for only a short period of time the deactuation of the armature permits spring 119 which couples the lever 118 to the frame of the apparatus to return the lever to its initial position with tripping gear 116 out of mesh with gear 121. To ensure that gear 116 will not jam with timing gear 121, opposed cylindrical surfaces 131 and 132 are provided coaxially with gears 121, 116. Each of the opposed surfaces is of the respective pitch diameter of the gear with which it is coaxially mounted for rotation and thus limits the extent to which the teeth of the gears may intermesh. During rotation of the stripper timing gear 120 and thus also cam 123, the cam follower 124 is moved out of a detent 123*a* formed on the high end of the cam 123. A segmental portion 123*b* of the cam comprises a lower level thereof and is dimensioned to permit spring 125 attached to the cam follower 124 to urge stripper element 27 against the drum. With continued rotation of the stripper timing gear 120 by the gear 130, a high portion of the cam is again encountered by the cam follower 124 and the stripper element 27 is urged away from contact with the processing drum. At the end of one full revolution of the stripper timing gear 120, the cam follower returns into the detent 123*a* to lock the timing gear 120 against accidental rotation by minor forces or inertia. The timing gear 120 now stops as it is no longer being driven by gear 130 which is in opposed relationship to concave segment 120*a*. It will be noted that the timing gear 120 makes one revolution in the same time period that the gear 130 and the drum make several revolutions. The several revolutions of the drum starting with actuation of solenoid 127 comprises a first revolution to cause the sheet to be taken-up upon the drum, a second revolution in which the entire sheet remains on the drum to provide additional processing time and a third revolution in which the sheet is removed from the drum. The cam 123 is therefore designed so that the lower level thereof will be engaged by the follower 124 when the stripper element 27 can move into a space on the drum surface between the leading and trailing edges of the sheet just prior to completion by the leading portion of the sheet of a second revolution on the drum. The lower level 123b of the cam will continue to cooperate with the cam follower until the print has been stripped entirely from the drum.

Figure 12:
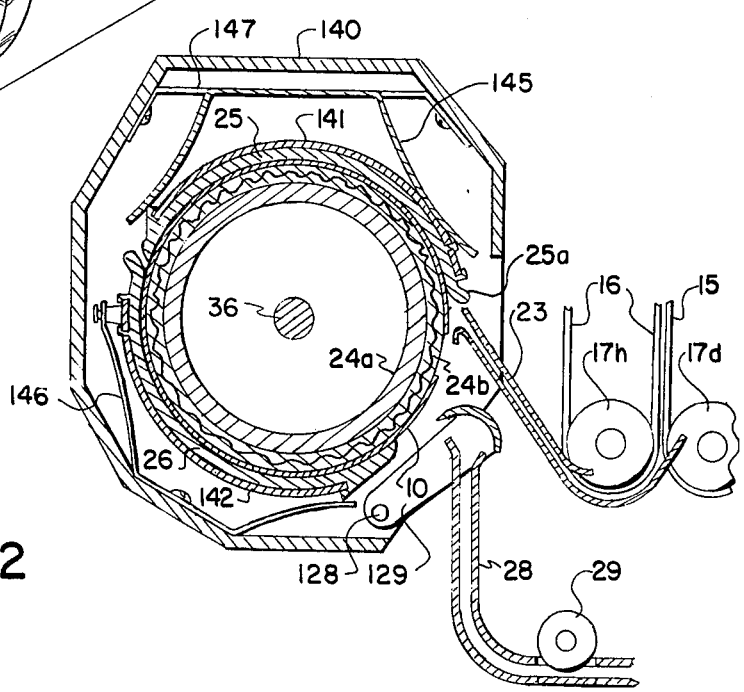
FIG. 12 is a section of a portion of the apparatus taken on the line 12—12 of FIG. 11.
Figure 14:
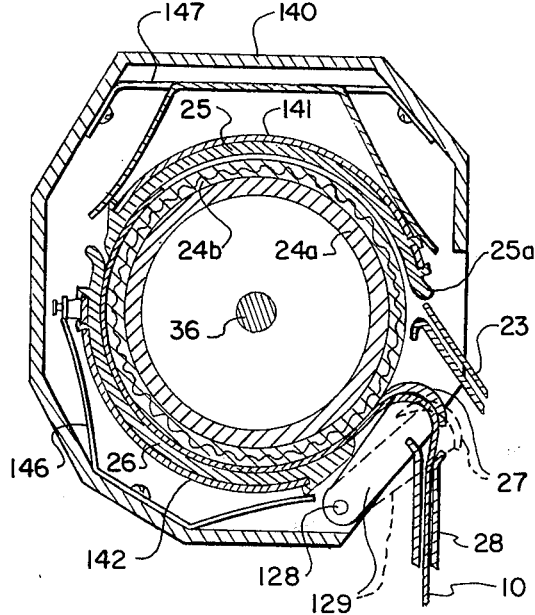
FIG. 14 is a view similar to that of FIG. 12 but showing the apparatus at a later time in the print cycle.

With specific reference to FIGS. 11, 12 and 14 the processor portion of the apparatus includes a prism-like housing 140 which is substantially enclosed to provide for a minimum of heat loss. The housing is partially open at opposite ends thereof to permit the driven shaft 36 to pass therethrough to the stripper timing mechanism. An additional opening is also provided along one segment of the housing to permit introduction and removal of a sheet from the processor. The cylindrical processor drum 24 is also supported on shaft 36 and comprises a cylindrical aluminum drum 24a upon which a sleeve of fibrous material 24b is supported to cover the periphery of the cylinder. The covering material is preferably made of frictional material of say nylon fibers, for example Nomex* fibers, that are woven into a seamless tubular configuration. The material should be functional at the operating temperatures at which the processor drum will be run. In order to heat a print as it is supported on the drum 24 there are provided upper and lower heating shoes 25, 26 respectively, which have their inner surfaces curved to the cylindrical contour of the drum. The shoes may be made of aluminum to provide good heat conduction between the inner surfaces of the shoes, which contact the sheet, and the outer surfaces of the shoes upon which are supported electrical heating pads 141, 142 respectively. The shoes 25, 26 are located and urged against the drum by springs 145 and 146 respectively so that a substantial portion of the drum is covered with the shoes but for a segment thereof for which access is provided to permit movement of the sheet to and from the drum. The upper shoe 25 includes a lip portion 25a which is curved away from the drum to permit a sheet to be introduced from the exposure station via a guide 23 that provides spaced guiding surfaces that lead towards lip portion 25a. The shoes further include longitudinally extending ridges and grooves, which are used to cooperate with springs 145, 146 and to also support electrical heat control elements such as thermistors and over-temperature thermostats. Springs 145, 146 each may be formed from flexible sheet metal which has been bent into a generally U-shaped configuration wherein the end portions of the arms of the "U" abut against or are attached to the drum shoes and the flat base portion of the "U" abuts against a flat heat shield 147, in the case of the upper spring 145, and the inner surface of the housing 140, in the case of the lower spring 146. The heat shield 147 is made of sheet metal to reduce the amount of heat emanating through the top of the housing. Thus the heat sheild tends to provide for a more uniform temperature distribution within the walls of the housing. In addition fan blowers, fuses and other conventional devices may be used to regulate the temperature of the housing. The inner surfaces of the shoes have a relatively low coefficient of friction compared with the surface of the drum so that when the print is introduced upon the drum it has a tendency to move with the drum. In this regard it may be noted that the sheet will move with the drum if the frictional force created between the periphery of the drum and the emulsion surface of the sheet is greater than that force between the inner surface of the shoes and the back surface of the sheet. Since the drum rotates when there is no sheet on the drum the frictional force between the shoes and the drum must not be too great.

*Registered trademark owned by E. I. DuPont and Co.

Figure 17:
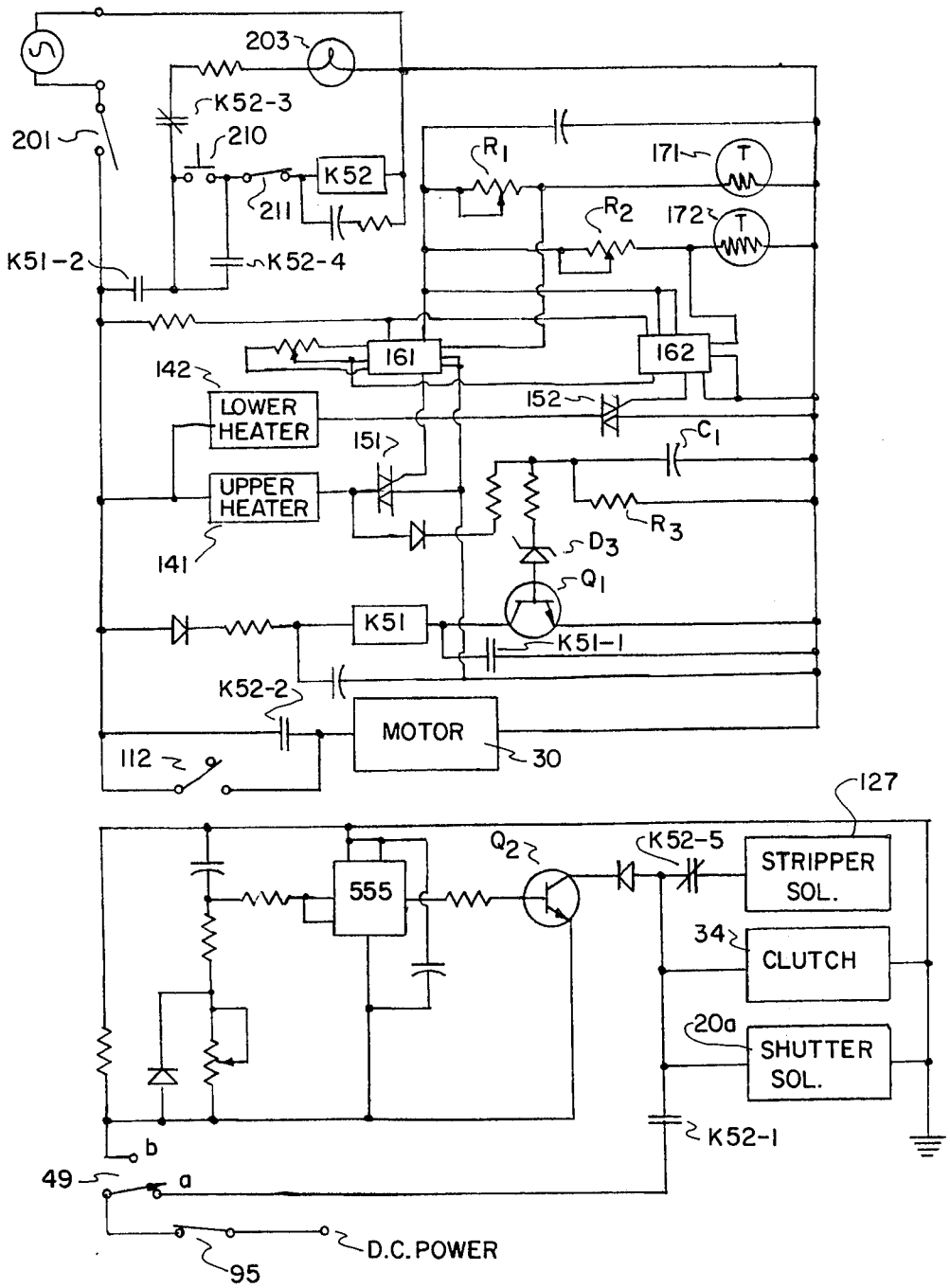
FIG. 17 is a schematic diagram of an electrical circuit which operates in combination with the mechanical apparatus of the preferred embodiment.

The overall operation of the apparatus will now be described with regard to the electrical controls shown in FIG. 17 and the mechanical controls which have previously been described and which are shown in the other drawings. When the operator wishes to produce a print he first would designate the print length desired by turning lever 85 (FIG. 9) to the appropriate mode i.e. 5½ inches or 11 inches in the example disclosed herein. Thereafter the operator closes the AC power switch 201 to deliver alternating current to the upper and lower heating pads 141, 142 of the drum's heating shoes. Each of the heating pads 141, 142 has associated therewith a triac 151 and 152, respectively, which controls current to the pads in response to signals from a zero crossing detector 161, 162 respectively. The function of each detector is to compare the resistance of a thermistor 171, 172 respectively on each heating shoe with a set resistance R1, R2 respectively. The set resistances are each adjusted to a value that is representative of the resistance of the thermistor at the desired processing temperature. So long as the temperature sensed by the thermistor is below the desired value, the detector will provide a pulse to the gate terminal of the respective triac at the beginning of each zero crossing of the alternating current power source thereby permitting power to be delivered to the respective heating pad. When a point is reached when the resistance of a thermistor is equal to that of its respective set resistance the respective detector discontinues delivering pulses to its respective triac and the latter ceases the conducting of current. With the shutting-off of triac 151 a minimum of current will be delivered through the upper heating pad to an RC net work R3, C1 that is coupled through a Zener diode, D3, to the base terminal of transistor Q1. After a certain level of charge is induced on the capacitor C1 transistor Q1 will conduct and thereby actuate a relay K51 that is connected in series with the collector terminal of the transistor. Actuation of relay K51 closes relay contact K51-1 which locks the relay in the actuated mode. In addition relay contact K51-2 will be closed and current will now flow through normally closed relay contact K52-3 to turn on the apparatus ready light 203. With the apparatus indicating that it is ready to make a print, the operator may now depress the print switch 210 which causes a pulse to be delivered to relay K52. Actuation of relay K52 closes relay contact K52-4 thereby locking relay K52 in the actuated mode so that the print button may be released by the operator. In addition, relay contact K52-2 is closed to provide power to the drive motor 30 and contact K52-1 is closed to provide DC power to actuate the solenoid 20a of the shutter 20 and the clutch 34. DC power will only be provided if the switch 95 is closed. This switch will be closed only when the lever 85 (see FIG. 9) is properly set in one or the other of the desired paper length modes. The shutter solenoid 20a when actuated closes the shutter 20 (FIG. 1) to prevent light from the source 19 from exposing the print. With actuation of both the clutch 34 and the motor 30, the cycle-timing mechanism will now be caused to rotate.

As more fully described above the cycle-timing mechanism includes a cam 46 (FIGS. 4A and 4B) that is associated with a switch arm 5 of a switch 49. With the switch arm 50 riding on the high side 47 of cam 46 the switch 49 is in the position shown in FIG. 17 and adapted to conduct direct current from a suitable source (preferably derived from the AC source) to actuate clutch 34 and shutter solenoid 20a. Rotation of the cycle-timing mechanism causes the desired print length to be metered into the exposure station by (a) cooperation of partially toothed segment gear 65 or 70 with gear 66 which, through the gear train described, drives the metering rollers 13 and by (b) cooperation of the segment gear 54 with the gear train comprised of gears 55, 57 through 62 which drive the rollers 17 and belts 15, 16 between which the paper is supported. After the paper has been metered into the exposure station it is cut by the knife mechanism 9 as described above. In addition the mirror now has been removed so that it no longer blocks light from source 19 from exposing the print. With the continued rotation of the cycle timing mechanism, the switch arm 50 falls onto the lower level 48 of cam 46. This moves an internal switch arm of switch 49 from a contact "a" to contact "b". The result of this is to remove power from shutter solenoid 20a to thereby open the shutter 20 to commence exposure of the print for a predetermined time period and also to de-energize clutch 34 to stop the cycle timing mechanism. The movement of the internal switch arm to the contact "b" introduces the source of DC current to an exposure timing circuit which may comprise appropriate resistors and capacitors which after the predetermined exposure period are adapted to create at the output of the conventional 555 timer a signal level that causes sufficient current to flow into the base terminal of a transistor Q2 to permit transistor Q2 to be in a conductive mode. The emitter-collector terminals of transistor Q2 are now in series with the DC source of power and, when the transistor is conducting, current may flow to and actuate the clutch 34 and the shutter solenoid 20a. Actuation of these two components respectively recommences rotation of the cycle-timing mechanism and closes the shutter to terminate exposure of the print, respectively. Rotation of the cycle-timing mechanism causes the print to be rapidly advanced by the moving belts 15, 16 so that the print is quickly removed from the exposure area and advanced on to the processing drum where it is supported between the drum surface and the heating shoes 25, 26 for heat processing. With continued rotation of the cycle-timing mechanism and just prior to the cycle timing mechanism's return to its initial position and further with the print completely removed from the exposure area a small ramp 180 formed on one of the side faces of gear 37 (see FIG. 2) brushes against a normally closed print reset switch 211 (FIG. 17) to open same and thereby deactuate relay K52. Deactuation of this relay closes the normally closed relay contacts K52-3 and current again flows to the print ready light indicating that the apparatus is now ready to make the next print. The deactuation of relay K52 also opens contact K52-2 which conducts current to the drive motor 30. However, a parallel route for the current is provided by the normally open end-of-cycle switch 112 which is tripped to the closed position by the movement of pin 96 on the cycle-timing mechanism (FIGS. 10A and 15) against L-shaped member 100 of the end-of-cycle revolution counting timing mechanism. As described above this mechanism ensures that power is provided to the motor 30 to rotate the processing drum through a sufficient number of revolutions to process the sheet and remove same from the drum.

Figure 13A:
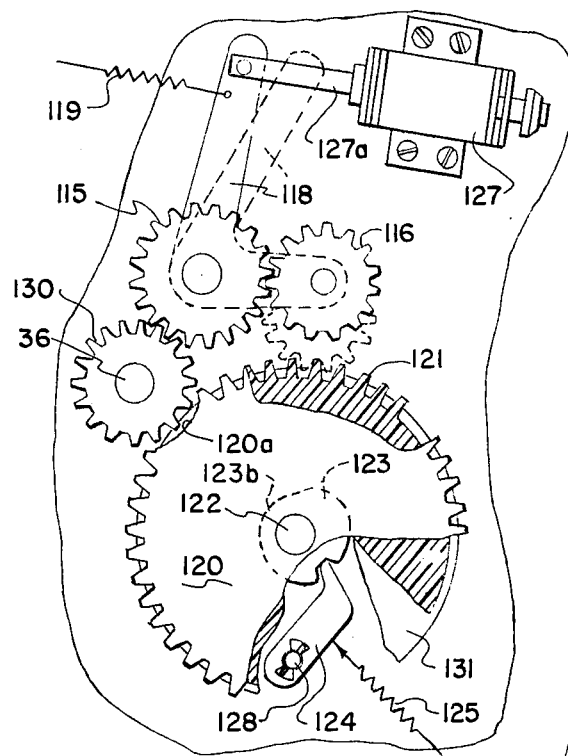
FIG. 13A is a side elevational view of the apparatus shown in FIG. 11 with portions thereof additionally shown in phantom to illustrate a second position thereof.
Figure 13B:
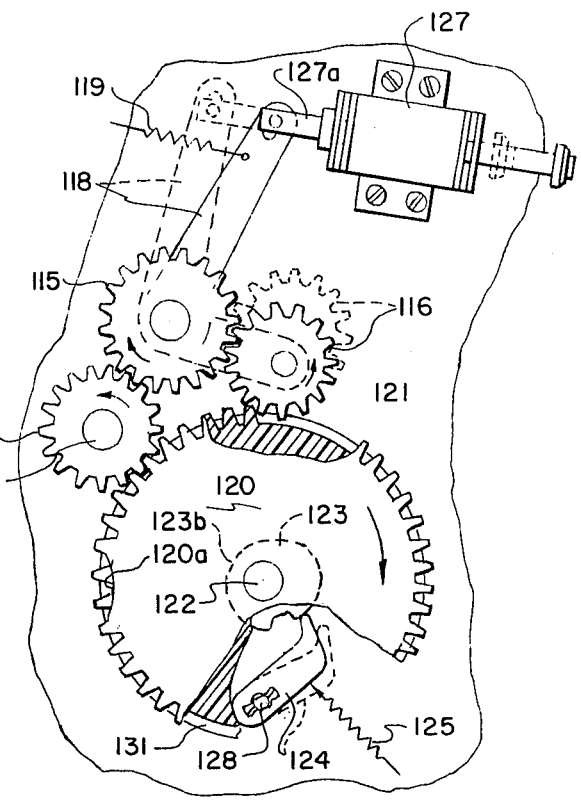
FIG. 13B is a view identical to that of FIG. 13A but showing the relative position of the apparatus at later times.

Deactuation of relay K52 also closes normally closed relay contacts K52-5 which will actuate the stripper solenoid 127 (see FIGS. 13A and B). This will result in cycling of the cam 123. At the appropriate time in the stripper timing cycle and after the leading portion of the sheet has made more than one full revolution upon the drum the stripper timing cam follower 124 encounters the lower level 123b of cam 123 and the stripper element 27 is urged against the drum to strip the print from the drum.

The invention has been described in detail with particular reference to a preferred embodiment thereof but is will be understood that variations and modifications can be effected within the spirit and scope of the invention.

We claim:

1. An apparatus for making prints, from sensitized sheets, the apparatus comprising:
   an exposure station including means for selectively exposing and means for supporting a sensitized sheet during exposure thereof to form a latent image on the sheet;
   a processing station for developing an exposed sheet, the processing station including means defining a rotatably supported drum upon which each portion of an exposed sheet may be supported for rotation with the drum for a substantially fixed time period that is required for the processing of the sheet;
   means for rotatably supporting the drum and for rotating the drum about its axis at a rate such that the drum makes one complete revolution in a time period that is less than the said time period required for the processing of the sheet;
   means for delivering a sensitized sheet to the exposure station for selective exposure thereof and for simultaneously removing a previously exposed sheet from the exposure station and advancing same onto the drum while the drum is rotating at said rate so that the leading portion of such exposed sheet is taken up first by the rotating drum and succeeding portions of such sheet are thereafter taken-up in turn upon the drum;
   sheet removing means adapted to be located adjacent the drum for removing a processed sheet from the rotating drum by removing the leading portion of the sheet first with succeeding portions of such sheet being removed in turn from the drum; and
   control means coupled to said sheet removing means for controlling the sheet removing means so that the sheet removing means removes the processed sheet from the drum only after each portion of the sheet has been supported on the drum for more than one complete revolution of the drum.

2. The apparatus of claim 1, wherein the processing means comprises heating means for heating the sheet while supported on the drum.

3. The apparatus of claim 2 wherein the drum has an outer cylindrical surface upon which the sheet may be supported and wherein the heating means includes a shoe having a curved surface and spring means for resiliently urging the shoe into intimate contact with a segment of the outer cylindrical surface of the drum.

4. The apparatus of claim 1 wherein the control means comprises:
a first gear;
means for driving the first gear so that the first gear is driven only when the drum is rotating;
a second gear located so as to engage and be driven by the first gear, the second gear having a segment thereof formed without gear teeth so that when such segment is in opposing relationship with the first gear the first gear does not drive the second gear;
means for rotating the second gear at a predetermined time to remove the toothless portion thereof from opposing relationship with the first gear; and
means coupling the sheet removing means to the second gear for controlling movement of the sheet removing means towards the drum.

5. The apparatus of claim 1 wherein said control means comprises:
a pivotable arm;
means for supporting the arm for pivotable movement about an axis;
first gear means rotatively mounted for rotation about the axis;
second gear means rotatively mounted upon the arm at a position spaced from the axis of the arm, the second gear means being drivingly engaged by the first gear means;
third gear means drivingly engaged with the first gear means;
means coupling the third gear means with the drum rotating means so that the third gear means is driven only when the drum is rotating;
fourth gear means located so as to engage and be driven by the third gear means, the fourth gear means having a segment thereof formed without gear teeth so that when such segment is in opposing relationship with the third gear means the third gear means does not drive the fourth gear means, the fourth gear means also being located proximate to the second gear means so that when the arm is pivoted in a first direction the second gear means moves towards and drivingly engages the fourth gear means for a predetermined time sufficient to remove the toothless segment from opposition with the third gear means;
means for pivoting the arm in the first direction;
cam means coupled with said fourth gear means so as to be rotated by the fourth gear means; and
cam follower means cooperating with the cam means and coupled to the sheet removing means for controlling movement of the sheet removing means towards the drum.

6. The apparatus of claim 5 wherein the second and fourth gear means each have respectively coaxially mounted therewith a cylindrical surface equal to the pitch diameter of a gear of the respective gear means which such surface is mounted with, the respective cylindrical surfaces of the second and fourth gear means being so located as to engage one with the other when the second gear means is in driving engagement with the fourth gear means.

7. The apparatus of claim 5 wherein the first gear means extends axially for a distance greater than the axial extent of each of the second and third gear means, the second and third gear means being supported in axially spaced relationship from each other.

8. The apparatus of claim 1 wherein the means for rotating the drum comprises an electrically powered motor and counting means responsive to the turning of the drum for disconnecting power to the motor after a predetermined number of revolutions of the drum.

9. The apparatus of claim 8 wherein the counting means comprises a foot-like member having a plurality of adjacent toe-like projections formed thereon, the toe-like projections being separated by notches, means for pivotally supporting the foot at about the heel portion thereof, spring means for biasing the foot for pivotal movement in a predetermined direction about the heel, a latch member located relative to the foot so that it may enter serially at least some of the notches and thereby engage and cooperate with the toes to block the foot from pivotal movement in the direction urged by the spring means; means coordinated with the rotation of the drum for moving in serial fashion individual toes into blocking engagement with the latch member so that a number of toes so moved is related to a predetermined number of revolutions of the drum, switch means for controlling power to the drum, and means associated with the foot for affecting the switch means so as to remove power to the drum after a predetermined number of revolutions of the drum.

10. The apparatus of claim 9 wherein the means coordinated with the rotation of the drum comprises a pin eccentrically mounted relative to the axis about which the drum is driven.

11. The apparatus of claim 10 wherein the means for pivotably supporting the foot comprises an arm, the foot being pivotably supported at a position adjacent to one end of the arm.

12. The apparatus of claim 11 and including:
means for pivotably supporting the arm at a position spaced from the position at which the foot is supported;
second spring means for biasing the arm so as to position the foot adjacent to the latch member; and
means for briefly pivoting the arm against the bias of the second spring means to displace the foot from the latch member so that after such pivoting the two spring means cooperate to urge the foot into an initial counting position, in which position a first toe is blocked by the latch member and a plurality of toes are located relative to the pin so as to be movable, in turn, over the latch member during successive revolutions of the drum.

13. An apparatus for making prints comprising in combination:
means for storing a web of sensitized material in the form of a roll;
means for metering the web to provide a web portion of a predetermined length;
an exposure station including means for exposing the web portion and means for supporting the web portion during the exposure thereof to form a latent image thereon;
means for cutting the web so as to sever the web portion from the remainder of the roll;
a processing station including means for processing the exposed web portion, the processing station further including means defining a rotatably supported drum upon which the web portion may be supported for rotation with the drum during at least a portion of the time required for the processing of the web portion;

means including a motor for rotatably supporting the drum and for rotating the drum about its axis;

counter means activatable during a cycle for maintaining power to the motor for a selected number of drum revolutions;

means for advancing the web portion into the exposure station and after exposure advancing the web portion onto the drum while the drum is rotating so that the leading portion of the web portion is taken-up first by the rotating drum and succeeding portions of the web portion are thereafter taken-up in turn upon the drum;

web stripper means adapted to be located adjacent the drum for removing the web portion from the rotating drum by removing the leading portion of the web portion first with succeeding portions of the web portion being removed in turn from the drum;

clutch means coupled to the motor for selectively controlling power from the motor to a cycle timing mechanism;

control means including the cycle timing mechanism adapted to be rotated as a unit about an axis for controlling the cyclical advancement, exposure and processing of the web portion, the cycle timing mechanism having a multiple number of functional levels on the periphery thereof which levels are distributed axially along the mechanism, such levels comprising:

a. cam means coupled to the cutting means, the exposure means and the clutch means for controlling movement of the cutting means, initiation of the exposure of the web portion and rotation of the cycle timing mechanism;

b. a fully toothed gear coupled to the clutch for rotating the cycle timing mechanism through a cycle;

c. a first partially toothed gear coupled to the web portion advancing means and a second partially toothed gear coupled to the web metering means, the first and second partially toothed gears motivating the respective means to which they are coupled during the portions of the cycle determined by the respective toothed portions of each gear;

d. means eccentrically mounted about the axis of the mechanism for actuating the counter means to commence a count of drum revolutions; and means coupled to the web stripper means and to the cycle timing mechanism for actuating movement of the stripper means so that the stripper means is located against the drum and removes the web portion from the drum only after each portion of the web has been on the drum for more than one revolution of the drum.

14. The apparatus of claim 13 wherein the cycle timing mechanism further includes:

a third partially toothed gear, located axially adjacent to the second partially toothed gear, for metering a web portion of different length from that metered by the second partially toothed gear;

and wherein the metering means includes:

a fully toothed gear movable parallel with the axis of the cycle timing mechanism from and to positions in which it may be meshed with either of the second and third partially toothed gears; and means for supporting and moving the fully toothed gear of the metering means relative to the second and third partially toothed gears to meter a web portion of one of two lengths as determined by which of the partially toothed gears the fully toothed gear of the metering means is meshed with.

15. The apparatus of claim 14 wherein the cycle timing mechanism and the fully toothed gear of the metering means includes means for locking the fully toothed gear of the metering means against rotation during a period of a cycle when both the second and third partially toothed gears are out of driving engagement with the fully toothed gear of the metering means.

16. A method for making prints, the method comprising:

a. advancing a sheet to an exposure station;

b. selectively exposing the sheet to form a latent image thereon;

c. simultaneously with step "a" removing a previously exposed sheet from the exposure station and advancing the previously exposed sheet onto a rotating drum, the drum rotating at a rate such that the drum makes one complete revolution in a time period that is less than the time period required for the processing of each portion of the sheet, so that the leading portion of the sheet is taken up first by the rotating drum and succeeding portions of the sheets are thereafter taken up in turn upon the drum;

d. supporting the previously exposed sheet on the drum and heating the sheet so as to develop the latent image formed thereon; and e. after each portion of the sheet has been supported on the drum for more than one complete revolution of the drum removing the sheet from the drum by removing the leading portion of the sheet first with succeeding portions of such sheet being removed in turn from the drum.

17. The method according to claim 16 in which the sheet is a photosensitive sheet.

* * * * *